United States Patent
Hedberg

(10) Patent No.: US 9,740,442 B2
(45) Date of Patent: Aug. 22, 2017

(54) VIRTUAL INPUT/OUTPUT DEVICE FOR PRINTERS

(75) Inventor: Mats Hedberg, Varberg (SE)

(73) Assignee: SATO HOLDINGS KABUSHIKI KAISHA (JP)

(*) Notice: Subject to any disclaimer, the term of this patent is extended or adjusted under 35 U.S.C. 154(b) by 0 days.

(21) Appl. No.: 13/075,785

(22) Filed: Mar. 30, 2011

(65) Prior Publication Data

US 2012/0154852 A1 Jun. 21, 2012

Related U.S. Application Data

(60) Provisional application No. 61/425,519, filed on Dec. 21, 2010.

(51) Int. Cl.
*G06F 3/12* (2006.01)

(52) U.S. Cl.
CPC ............ *G06F 3/1225* (2013.01); *G06F 3/123* (2013.01); *G06F 3/1208* (2013.01); *G06F 3/1287* (2013.01); *G06F 3/1292* (2013.01)

(58) Field of Classification Search
CPC ....... G06F 2212/151; G06F 2003/0694; G06F 3/1297; G06F 3/04886; G06F 9/45504;
(Continued)

(56) References Cited

U.S. PATENT DOCUMENTS

| | | | | |
|---|---|---|---|---|
| 5,699,494 A | * | 12/1997 | Colbert | G06F 3/1293 358/1.13 |
| 6,927,865 B1 | * | 8/2005 | Kujirai | G06F 3/1208 358/1.12 |

(Continued)

FOREIGN PATENT DOCUMENTS

| | | |
|---|---|---|
| EP | 1 566 719 A2 | 8/2005 |
| EP | 2 133 835 A2 | 11/2009 |

(Continued)

OTHER PUBLICATIONS

Introducing the new SmartSolutions/Lexmark United States (3 pages).

(Continued)

*Primary Examiner* — Henok A Shiferaw
(74) *Attorney, Agent, or Firm* — Ostrolenk Faber LLP

(57) ABSTRACT

A system and method for operating a printing device is disclosed. A connection is provided between a computing device and the printing device, wherein the printing device is configured with a software application. Instructions are executed on the computing device, which provide the software application on the computing device. The computing device receives at least one input in the software application on the computing device, and transmits to the printing device at least one command associated with the at least one input. The printing device operates in response to the at least one command substantially in the same manner as it operates in response to at least one second input received in the software application provided on the printing device. The at least one first input in the software application on the computing device corresponds to the at least one second input in the software application on the printing device.

32 Claims, 11 Drawing Sheets

(58) Field of Classification Search
CPC . G06F 2009/45562; G06F 2009/45595; G06F 3/1225; G06F 3/1208; G06F 3/123; G06F 3/1287; G06K 15/025; G06K 15/026
See application file for complete search history.

(56) References Cited

U.S. PATENT DOCUMENTS

| | | | |
|---|---|---|---|
| 2003/0048470 A1 | 3/2003 | Garcia | |
| 2004/0184100 A1* | 9/2004 | Shahindoust | H04L 29/08846 358/1.15 |
| 2004/0257259 A1* | 12/2004 | Jindal | G08C 17/02 341/176 |
| 2005/0094163 A1* | 5/2005 | Kim | G06F 3/1232 358/1.6 |
| 2005/0183141 A1 | 8/2005 | Sawada | |
| 2006/0077423 A1* | 4/2006 | Mathieson | H04N 1/00204 358/1.15 |
| 2006/0077448 A1 | 4/2006 | Plewnia | 358/1.15 |
| 2006/0077452 A1 | 4/2006 | Nguyen | 358/1.15 |
| 2006/0077454 A1 | 4/2006 | Lum | 358/1.15 |
| 2006/0196621 A1* | 9/2006 | Johansson | D21C 3/22 162/49 |
| 2007/0143089 A1* | 6/2007 | Sakai | H04N 1/46 703/13 |
| 2010/0309504 A1* | 12/2010 | Partridge | G06F 3/1293 358/1.15 |
| 2012/0293823 A1* | 11/2012 | Gribel | G06F 3/1205 358/1.13 |

FOREIGN PATENT DOCUMENTS

| | | |
|---|---|---|
| JP | 08-018723 | 1/1996 |
| JP | 2005-262864 A | 9/2005 |
| JP | 2006-115301 | 4/2006 |
| JP | 2007-102773 | 4/2007 |
| JP | 2008-092141 A | 4/2008 |
| JP | 2009-026073 A | 2/2009 |
| JP | 2010-256329 | 11/2010 |
| WO | WO 99/15955 A1 | 4/1999 |

OTHER PUBLICATIONS

All Products/Printers & MultiFunction/Lexmark Office Edge Pro 5500/Lexmark (2 pages).
All Products/Printers & MultiFunction/Lexmark Office Edge Pro 5500t/Lexmark (2 pages).
Ross Miller, "Exclusive: HP Photosmart eStation C510 is Android-powered Zeus/Zeen, may not run Gmail or Market apps," http://www.engadget.com/2010/09/07/exclusive-hp-photosmart-estation-c510-is-android-powered-zeus#, (Sep. 7, 2010)(7 pages).
Display PostScript, From Wikipedia, http://en.wikipedia.org/wiki/Display_PostScript (3 pages). Mar. 16, 2011.
NeWS, From Wikipedia, http://en.wikipedia.org/wiki/NeWS, (4 pages). Apr. 12, 2011.
PostScript, From Wikipedia, http://en.wikipedia.org/wiki/PostScript (9 pages). Mar. 21, 2011.
Trail: 2D Graphics, Lesson: Printing, http://download.oracle.com/javase/tutorial/2d/printing/index.html (1995) (2 pages).
"Printing with the Java Applet," http://www.coralind.com/hfhtml/help/java/printer/HFHelp.htm (7 pages). 2011.
Printer Protocol Interpreter DGL™, Programmer's Reference Manual for DGL, a Datamax® DPL™ Printer Protocol Interpreter (2006, 2009).
iEPP Application—Use It, http://www.usa.canon.com/cusa/consumer/standard_display/iepp_useit,(2 pages). Oct. 2010.
iEPP Application, http://www.usa.canon.com/cusa/consumer/standard_display/iepp_home, (2 pages). Jul. 2010.
iEPP Application—Explore It, http://www.usa.canon.com/cusa/consumer/standard_display/iepp_explore, (2 pages) 2011.
Joel Mathis, Macworld.com, "Epson iPrint adds document, web printing options," http://www.macworld.com/article/160657/2011/06/epsoniprint.html, (1 page). Jun. 2011.
Mobile Printing With Epson, Performance on the Go, http://www.epson.com/cgi-bin/Store/jsp/dlp/dynamicLanding.do?dlpId=n_1007_m . . . (2 pages). 2011.
Jessica, PrintJinni for Epson App Gets Upgrade, Feb. 10, 2011, http://www.beststuff.com/blog/2011/02/10/printjinni-epson-app-gets-upgrade.h . . . (2 pages). 2011.
"ePrint" solves to print directory from iPad, iPhone or iPod touch, http://www.e-workshop-dev.com/PC_EN/eprint_e.html (1 page). 2008-2010.
Ross Miller, "Exclusive: HP Photosmart eStation C510 is Android-powered Zeus/Zeen, may not run Gmail or Market apps," Sep. 7, 2010 (2 pages).
"HP Android-Powered Photosmart eStation C510," http://ubergizmo.com/2010/09/hp-android-powered-photosmart-estation- . . . , Sep. 7, 2010 (2 pages).
HP Photosmart e-All-in-One Printer—D110a, HP® Official Store, Customer rating and reviews for Photosmart e-All-in-One, http://www.shopping.hp.com/product/printer/Photosmart/1/storefronts/CN731A . . . (2 pages). 2011.
HP Photosmart e-All-in-One Printer—C510a, HP® Official Store, Customer rating and reviews for Photosmart eStation C510a, http://www.shopping.hp.com/product/printer/Photosmart/1/storefronts/CQ140A . . . (2 pages). 2011.
HP Photosmart Premium e-All-in-One Printer—C310a, HP® Official Store, Customer rating and reviews for Photosmart C310a, http://www.shopping.hp.com/product/printer/Photosmart/1/storefronts/CN503A . . . (2 pages). 2011.
HP Photosmart Premium Fax e-All-in-One Printer—C410a, HP® Official Store, Customer rating and reviews for Photosmart Premium Fax e-All-in-One, http://www.shopping.hp.com/product/printer/Photosmart/1/storefronts/CQ521A . . . (2 pages). 2011.
HP Photosmart Plus e-All-in-One Printer—B210a, HP® Official Store, Customer rating and reviews for Photosmart Plus e-All-in-One—B210a, http://www.shopping.hp.com/product/printer/Photosmart/1/storefronts/CN216A . . . (2 pages). 2011.
International Search Report mailed Oct. 25, 2011 in corresponding International Application No. PCT/JP2011/004633.
Written Opinion mailed Oct. 25, 2011 in corresponding International Application No. PCT/JP2011/004633.
"A Guide to Smart Printing Understanding the Capabilities, Use Cases and Advantages of Smart Printers," 6 pages, Intermec Technologies Corporation, 2009.
Korean Office Action, dated May 26, 2014, issued in corresponding Korean Patent Application No. 10-2013-7018985. Including English translation. Total 7 pages.
Patent Examination Report No. 3 dated Nov. 20, 2015 in corresponding Australian Patent Application No. 2011346329 (4 pages).
Extended European Search Report, dated Dec. 17, 2014, issued in corresponding European Patent Application No. EP11852157.4. Total 8 pages.
Introducing the new SmartSolutions/Lexmark United States (2012) (3 pages).
All Products/Printers & MultiFunction/Lexmark Office Edge Pro 5500/Lexmark (2012) (2 pages).
All Products/Printers & MultiFunction/Lexmark Office Edge Pro 5500t/Lexmark (2012) (2 pages).
Lexmark SmartSolutions User's Guide (2011) (43 pages).

* cited by examiner

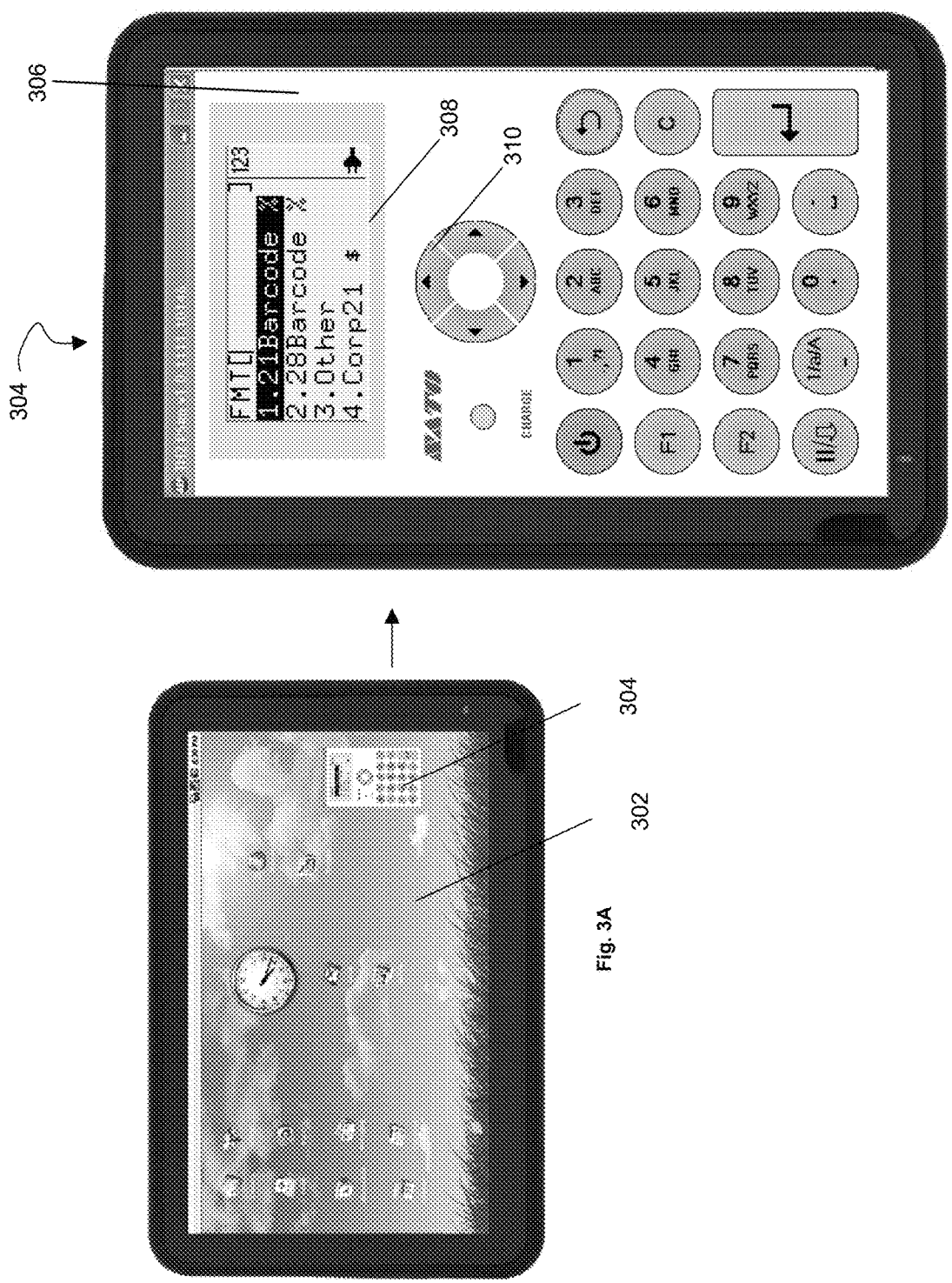

VIRTUAL INPUT/OUTPUT DEVICE FOR PRINTERS

RELATED APPLICATION

This application is based on and claims priority to U.S. Provisional Patent Application No. 61/425,519, filed on Dec. 21, 2010 and entitled VIRTUAL INPUT/OUTPUT DEVICE FOR PRINTERS, the entire contents of which are hereby incorporated by reference.

BACKGROUND

Field of the Invention

The present invention relates generally to printers and, more particularly, to remotely accessible printing devices.

Description of the Related Art

Many printing devices, such as label and tag printers including various kinds of thermal printers, require physical connections to computers for providing various kinds of printing-related functionality. In many instances, a computer must be physically connected to a printer for providing firmware, software applications and data for the printer.

Some printers, including label and tag printers, operate as stand-alone units, without requiring a computer to be physically attached for operation. In these cases, a printer may be configured with memory, an input device such as a keyboard, and an output device such as a display screen, for information to be provided from and to operators. Typically, a label and tag printer is configured with one or more custom software program applications that provide selectable menu options shown on the display screen, and that receive user input from the operator. Customized data output may also be managed as a function of software applications. Eventually, however, even printing devices that operate as stand-alone units need to physically interface with a computer, for example, for maintenance, upgrades of software or the like.

In many cases, it is not suitable to include a computer in a particular environment. Space may be extremely limited, cost may be a factor, or other conditions may exist that impede the usefulness or ability for a computer to be connected to a printer at any given time.

SUMMARY

A system and method for operating a printing device is disclosed. A connection is provided between a computing device and the printing device, wherein the printing device is configured with a software application. Instructions are executed on the computing device, which provide the software application on the computing device. The computing device receives at least one input in the software application on the computing device, and transmits to the printing device at least one command associated with the at least one input. The printing device operates in response to the at least one command substantially in the same manner as it operates in response to at least one second input received in the software application provided on the printing device. The at least one first input in the software application on the computing device corresponds to the at least one second input in the software application on the printing device.

In one or more embodiments, each of the computing device and the printing device is configured to communicate via a wired or wireless connection over a communication network.

In one or more embodiments, the instructions include firmware that is installed on the printing device.

In one or more embodiments, the printing device is configured with AEP capability.

In one or more embodiments, the printing device is not configured with AEP capability.

In one or more embodiments, the computing device transmits a request to connect to the printing device, the connection is provided as a function of the request.

In one or more embodiments, the computing device receives from a second computing device, software to be installed on the printing device, and the computing device transmits the software to the printing device.

In one or more embodiments, the computing device receives from the printing device an identification of the printing device, and uses the identification of the printing device to provide the software application on the computing device.

In one or other embodiments, the computing device connects to a second computing device, and transmits to the second computing device the identification, and receives from the second computing device the instructions that, when executed by the computing device, provides the software application on the computing device, as a function of the identification transmitted to the second computing device.

Other features and advantages of the present application will become apparent from the following description of the invention that refers to the accompanying drawings.

BRIEF DESCRIPTION OF THE DRAWINGS

For the purpose of illustrating the invention, there is shown in the drawings several forms, which are presently preferred, it being understood, however, that the invention is not limited to the precise arrangements and instrumentalities shown. The features and advantages of the present invention will become apparent from the following description of the invention that refers to the accompanying drawings, in which:

FIGS. 3A and 3B illustrate an example mobile computing device that is running the ANDROID operating system and operating in accordance with an embodiment;

DESCRIPTION OF EMBODIMENTS

Figure 1:
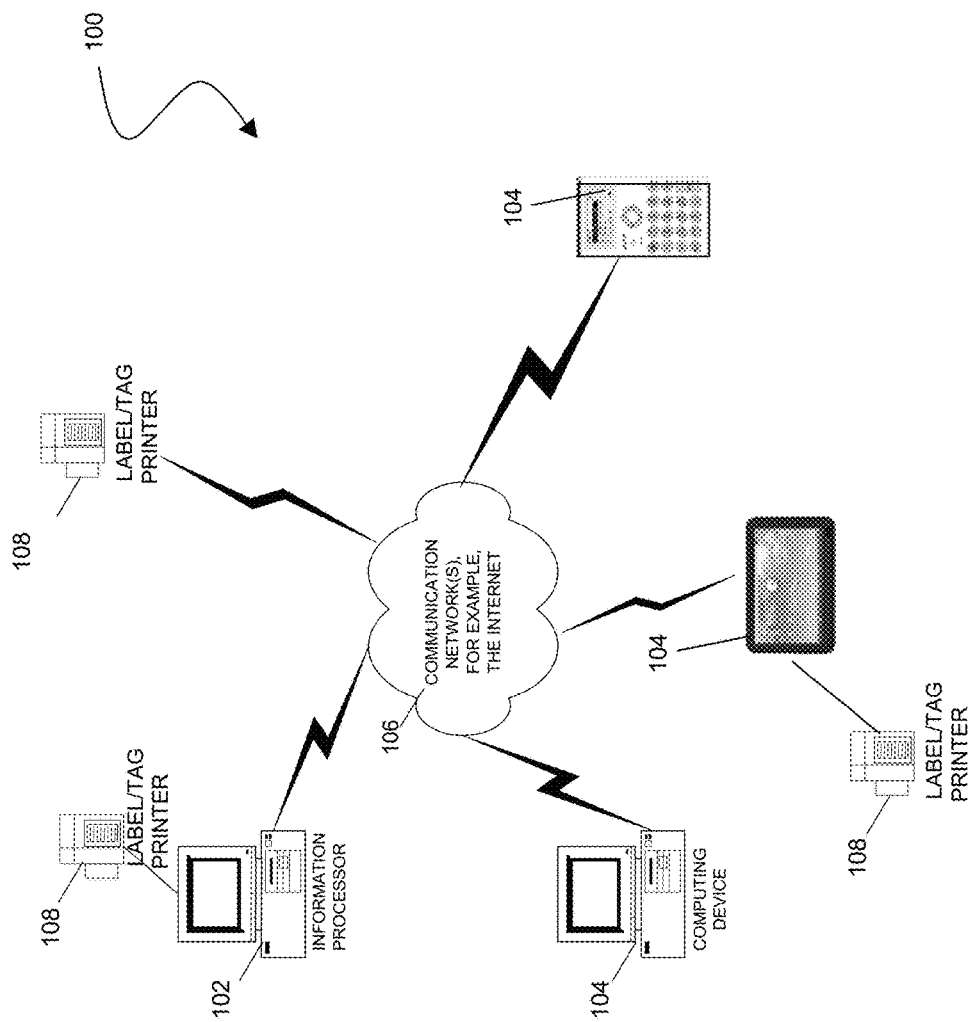
FIG. 1 illustrates an example hardware arrangement, in accordance with a preferred embodiment.

The teachings herein provide a system and method for remote printer-related connectivity, including to and from an input/output device such as a keyboard, touchpad, pointer, mouse or display screen provided with a computing device, and that enable a printing device to interface therewith and over a communication network. In an embodiment, a tablet computing device is programmed and configured to run one or more software applications developed, for example, for particular data output on the printer. The tablet computer preferably provides a graphical user interface that is substantially the same or identical to an interface provided on the printer, such as displayed on the printer's control panel. In an embodiment, the tablet computer may include the firmware and/or one or more applications that are executed by the printer.

In an embodiment, one or more printer-related software applications that operate on a tablet-style computing device, such as a device operating the ANDROID operating system, preferably utilize scripts and/or code libraries that facilitate applications to execute on or by a printing device, remotely. For example, an application enabled printing ("AEP") printer is configured with software, which may be firmware that configures the AEP printer to run custom printing-related software applications. In an embodiment, an interpreter or other software program is provided with an AEP printer that configures the AEP printer to execute one or more instructions, such as a custom printing software application that is suitable for a particular business or type of data. The instructions may be remotely transmitted by the mobile computing device and received by the AEP printing device, and the interpreter configured with the AEP printing device executes the instructions within the AEP printing device.

In an embodiment, the interpreter provided with the AEP printing device is a LUA language interpreter. In this embodiment, instructions written in LUA may be transmitted from the mobile computing device to the AEP printing device, and executed by the interpreter configured therewith. This embodiment enables significant printer-related functionality by a LUA program provided by the mobile computing device, and executed by the LUA interpreter provided with the AEP printing device.

Thus, a mobile computing device operating an application operable on an AEP printer, for example, extends functionality to the printing device. The printing device may be a label and tag printer. For example, mobile device-related functionality such as provided via a tablet computer's touch-screen, as well as networking-related functionality such as provided via Universal Serial Bus ("USB"), WLAN, GSM, 3G or 4G, is extended to a printing device, such as a SBPL or THL Printer, in accordance with the teachings herein.

Some printer applications that run on a computing device, such as a tablet computer and in accordance with the teachings herein, may be respectively designed for particular customers or users. Many if not all of the same options that are provided on a printer are preferably supported on the remote computing device. By providing the same (or essentially the same) applications on a portable computing device, such as via a printer's firmware, that operate on a printing device, significant flexibility is provided in the form of mobility as well as by leveraging functionality that is native to the computing device.

Referring now to the drawing figures, in which like reference numerals represent like elements, FIG. 1 illustrates an example hardware arrangement, in accordance with an embodiment of the present invention, for developing and providing remote printer-related connectivity, including over a communication network, and referred herein, generally, as system 100. System 100 preferably comprises at least one information processor 102 (configured to operate as an Internet web server and/or database file server) programmed and configured to access communication network 106 and communicate with computing device(s) 104. Computing devices 104 are preferably mobile devices, such as operating one or more of the ANDROID, IPHONE, WINDOWS MOBILE operating systems, smartphone devices, tablet computing devices, other mobile portable devices. Computing devices 104 and information processor(s) 102 may communicate via the known communications protocol, Transmission Control Protocol/Internet Protocol "TCP/IP." Information processor 102 and computing device(s) 104 preferably are provided with or have access to all databases necessary to support the present invention.

Information processor 102 and computing device(s) 104 may also be provided with printer firmware and/or software application that are installed on printing device 108. Printing device 108 is preferably a label and tag printer, and may be a thermal printer or other type of printer. Information processor 102 and/or computing device 104 may operate one or more software applications provided on printing device 108 for remote configuration and/or operation. In this way, software application(s) containing features described herein are executed and used to control printing device 108 remotely.

Communication network 106 is preferably a global public communication network such as the Internet, but can also be a wide area network (WAN), local area network (LAN), an intranet or other network that enables computing devices and peripheral devices to communicate.

In a preferred embodiment, information processor 102 and computing devices 104 are any computer readable medium devices that are capable of sending and receiving data across communication network 106, e.g., mainframe computers, mini computers, personal computers, laptop computers, a personal digital assistants (PDA), cellular telephones and Internet access devices such as Web TV. In addition, information processors 102 are preferably equipped with web browser software, such as MICROSOFT INTERNET EXPLORER, MOZILLA FIREFOX, or the like. Information processors 102 are coupled to communication network 106 using any known data communication networking technology.

As included in FIG. 1 and described above, printing device 108 is preferably a label and tag printer and operable to print labels and tags of data received from mobile computing device(s) 104 and/or information processors 102. Label and tag printer 108 may be configured with communications hardware and software to enable remote operations with one or more devices. Printing device 108 may also be provided with a keyboard and display to enable input and output locally in addition to or in conjunction with information processor 102 and/or mobile computing device 104.

Figure 2:
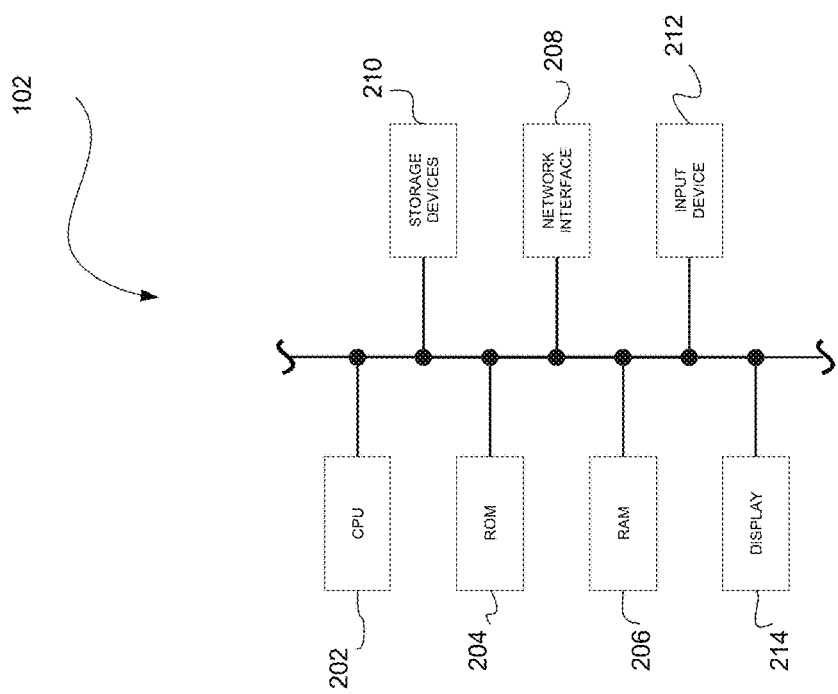
FIG. 2 illustrates the functional elements of an example information processor shown in FIG. 1.

FIG. 2 illustrates one or more functional elements of an example information processor 102, computing device 104 and/or printing device 108, and includes one or more central processing units (CPU) 202 used to execute software code and control operations. Other elements shown in FIG. 2 include read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code databases and application data, one or more input devices 212 such as a keyboard, mouse, track ball, microphone and the like, and a display 214.

The various components of illustrated in FIG. 2 need not be physically contained within a single device chassis or even located in a single location. For example, storage device 210 may be located at a site that is remote from the remaining elements of information processor 102, and may even be connected to CPU 202 across communication network 106 via network interface 208. Information processor 102, computing device 104 and/or printing device 108 may include a memory equipped with sufficient storage, such as to provide or access the necessary databases, forums, and other community services communicating hypertext markup language (HTML), Java applets, Active-X control programs. Information processor 102, computing device 104 and/or printing device 108 are arranged with components, for example, those shown in FIG. 2, suitable for the expected operating environment. The CPU(s) 202, network interface(s) 208 and memory and storage devices are selected to ensure that capacities are arranged to accommodate expected demand.

The nature of the present application is such that one skilled in the art of writing computer executable code (i.e., software) can implement the functions described herein using one or more of a combination of popular computer programming languages and developing environments including, but not limited to, LUA, C, C++, Visual Basic, JAVA, HTML, XML, ACTIVE SERVER PAGES, JAVA server pages, servlets, MYSQL and PHP.

Although the present application is described by way of example herein and in terms of a web-based system using web browsers and a web site server (e.g., information processor 102), system 100 is not limited to such a configuration. It is contemplated that system 100 is arranged such that label and tag printer 108 communicates with and outputs data received from information processor 102 and/or computing device 104 using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, WINDOWS 7, MAC OS, UNIX, LINUX, PALM OS, POCKET PC, BLACKBERRY, ANDROID and any other suitable operating system.

In an embodiment, an application (e.g., a "PSIM" application) is installed on mobile computing device 104 that is running the ANDROID operating system. The application configures mobile computing device 104 to operate as an external input/output device for the printing device. In this embodiment, computing device 104 may run one or more AEP applications, such as developed with AEP WORKS development software, and control the printing device accordingly. Mobile device 104 and printing device 108 are configured to communicate (e.g., via USB, BLUETOOTH, Wi-Fi, 3G or other suitable connectivity) and the transmission and reception of commands, such as bitmap or SBPL commands, enable the printing device to operate in accordance with one or more applications, such as AEP applications. In this embodiment, custom applications operate on mobile computing device 104 and control printing device 108, which prevents a need to modify hardware configurations of an existing printer and still supply substantial functionality by mobile computing device 104.

FIGS. 3A and 3B illustrate an example mobile computing device 104 that is running the ANDROID operating system. The example mobile computing device 104 shown in FIG. 3A is displaying the "Home Screen" 302 of the ANDROID operating system, and includes selectable icons and a functional clock "widget." As shown in FIG. 3A, selectable icon 304 that, when selected, enables device 104 to execute software and operate to remotely mimic and control one or more printing devices 108. In one embodiment, icon 304 is a functional "widget" and indicates menu options, selections and operations of a printing device 108 substantially in real time. In this way, a user can tell at just a glance whether an operation on a printing device is occurring, or whether a problem exists that is displayed or otherwise presented on a display associated with a printing device 108.

FIG. 3B illustrates an example software application 306 executing on mobile computing device 104 after icon 304 has been selected. As shown in FIG. 3B, a selectable menu 308 is provided for a user to select a respective output, such as via navigation wheel 310. Many other menu selections are supported by the present application in various usage contexts and functionally displayable via software application 306. For example, menu selections may apply for selecting printing devices, paper types, data values, users, or virtually any selectable menu choice supported by printing device 108.

Figure 3C:
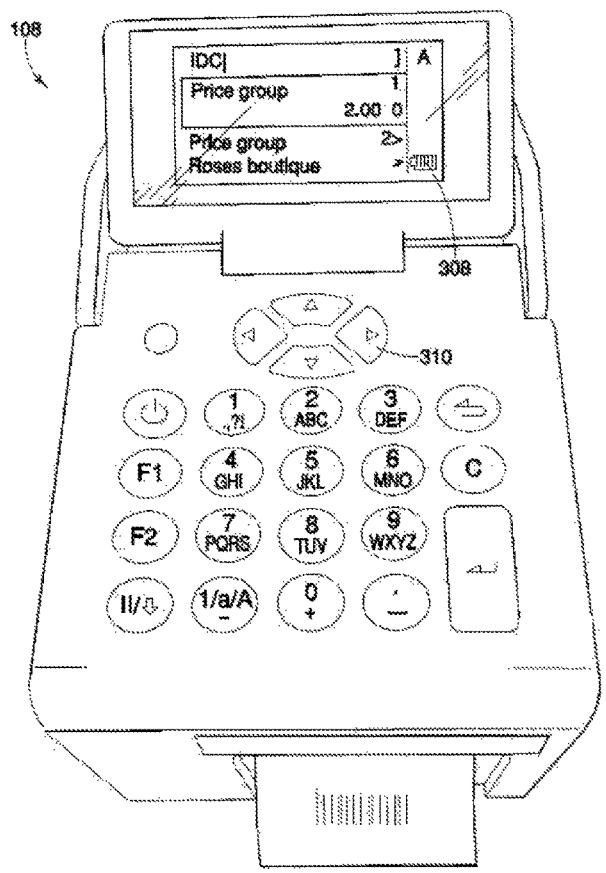
FIGS. 3C and 3D illustrate example printing devices that are operable in accordance with the teachings herein.

In one or more embodiments, mobile computing device 104 is configured with hardware and software that is substantially included in printing device 108. For example and as illustrated in FIG. 3C, printing device 108 is illustrated that is an AEP printing device and a particular printing software application has been installed thereon. Thus, printing device 108 shown in FIG. 3C is configured with firmware that has capabilities to execute one or more printing software applications. In an embodiment, printing software applications are provided as package files. The package file(s) are installed in printing device 108, and output, such as label(s), is provided via the printing device's 108 application software (e.g., via menu 308 and navigation wheel 310). The package file(s) may be similarly provided in computing device 104, which enable computing device 104 to operate as or otherwise emulate an AEP printing device. The output from printing device 108 may be provided via commands transmitted from mobile computing device 104, or commands received at the printer.

The layout and appearance of example printing device 108 shown in FIG. 3C is represented on mobile computing device 104, illustrated in FIG. 3B. For example, selectable menu 308 on printing device 108 is provided for a user to select a respective output, including via navigation wheel 310.

Figure 3D:
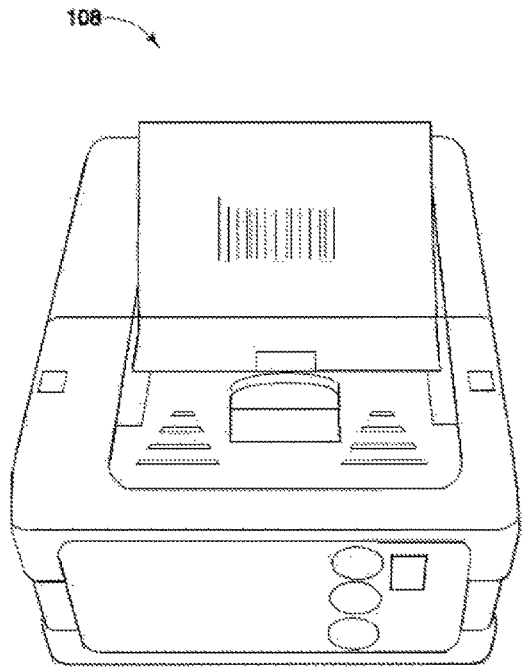

In addition to an AEP printing device 108, non-AEP printing devices 108 are supported in accordance with the teachings herein, such as printing device 108 illustrated in FIG. 3D. In the example shown in FIG. 3D, printing device 108 does not have the respective printing software application installed described above with reference to FIG. 3C. In an embodiment, computing device 104, for example configured with the ANDROID operating system, receives an AEP printing device software application and the application is installed. Thereafter, computing device 104 executes the application and the printer responds as if it were an AEP printing device.

Figure 3E:
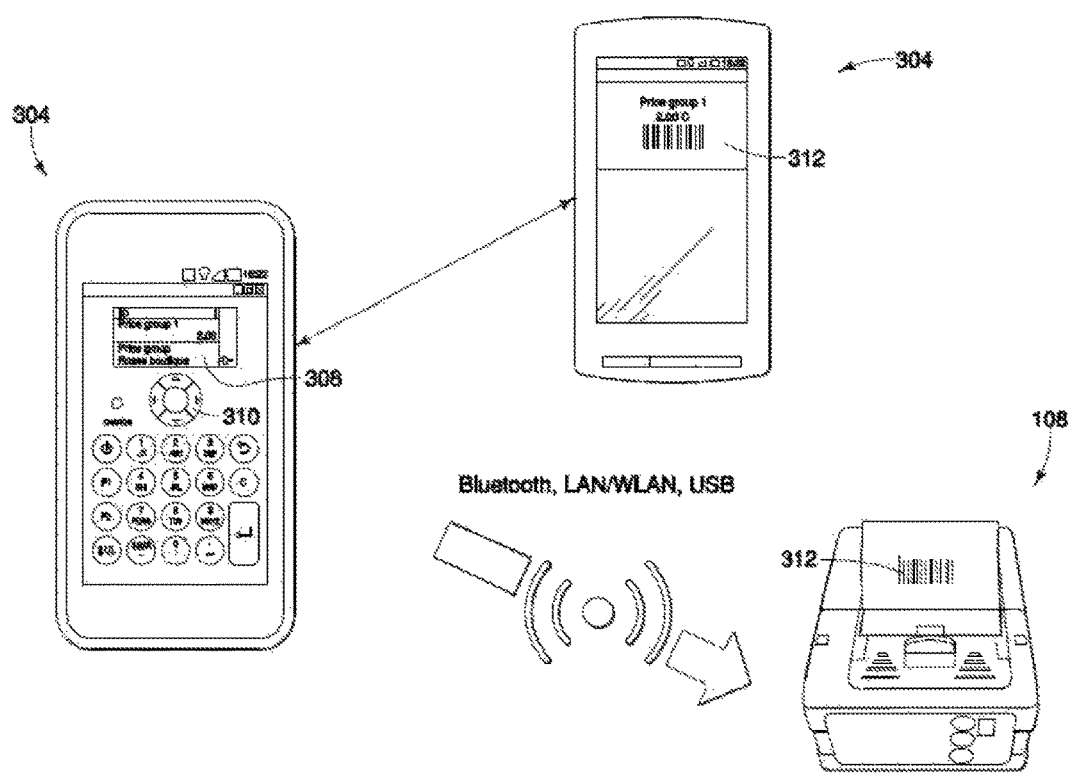
FIG. 3E illustrates an example mobile computing device operating a non-AEP printing device, and outputting a label and previewing the output label on the mobile computing device.

FIG. 3E illustrates an embodiment of the present application in which mobile computing device 104 is configured with an AEP software application and operable to control a non-AEP printing device 108, for example, via BLU- ETOOTH, local area network, wireless local area network and USB. Mobile computing device 104 is preferably configured for a user to access email, Internet web pages and virtually any other functionality associated with tablet and other mobile computing devices 104. In an embodiment, mobile computing device 104 is configured with the ANDROID operating system.

In addition, the example mobile computing device 104 shown in FIG. 3E is configured with an AEP software application that is provided with an AEP printing device 108, such as shown in FIG. 3C. Preferably, the AEP software application is executed within the ANDROID operating system. By providing an AEP software application on mobile computing device 104 and using that application in connection with non-AEP printing device 108, the non-AEP printing device 108 is functionally transformed to an AEP printing device 108. Also shown in FIG. 3E is label 312 that is output on printing device 108. Mobile computing device 104 is configured to provide a view or preview of label 312 for a user in advance of or simultaneously while printing device 108 is outputting or has output the label 312. In this way, a user of computing device 104 is assured of the respective output that is provided on printing device 108, even when printing device 108 is a non-AEP printer.

Thus and as illustrated in the example shown in FIG. 3E, mobile computing device 104 is configured to perform printing specific functionality, including rendering an image of output that is provided on printing device 108. In part, this is achieved via use of the same "shared" programming code in printing device 108 and in computing device 104. Moreover, computing device 104 is configured with the ANDROID operating system and, in an embodiment, an ANDROID software application that provides AEP printing software application functionality is executed thereon. For example, and as illustrated in FIGS. 3B and 3C, a software application (including keyboard and dial) are displayed on computing device 104) and corresponds with an application associated with printing device 108. In addition or alternatively, the software application operating on mobile computing device 104, which may include the respective application, is usable for printing to a non-AEP printer 108 (FIGS. 3D, 3E), via one or more connections, including BLUETOOTH, WLAN/LAN or USB. Labels (or other printed output) may be printed via a non-AEP printing device 108 that does not otherwise support AEP commands, for example, simply by a user operating the buttons and other controls provided with the printing device 108. Alternatively or in addition, labels (or other printed output) may be printed via a non-AEP printing device 108 in response to commands received from computing device 104, such as bitmap or other printer control commands, while computing device 104 executes an AEP software application.

In an embodiment, a computing device 104, such as a tablet computer, smartphone, PDA or other mobile device, is configured to discover and identify, substantially automatically, a respective printing device 108 that is or is capable of communicating over network 106. Mobile computing device 104 may connect to printing device 108, such as via TCP/IP or other suitable protocol. After an initial connection, computing device 104 may attempt to connect to printing device 108, thereafter in the future, automatically. Once connected, information may be provided to computing device 104 from printing device 108 in the form of a configuration file or other instruction format. Once received, the mobile computing device 104 may execute instructions contained therein to display a user interface and provide functionality that corresponds to or appears the same as provided by the printing device, such as illustrated in FIG. 3B. In one embodiment, computing device 104 is configured with software that executes on printing device 108 and executes the software to operate as printing device 108. In an alternative embodiment, printing device 108 "serves" instructions and/or information to computing device 104 that enable device 104 to operate in tandem and as printing device 108.

In an embodiment, firmware operating on the printing device is configured to receive one or more commands from a computing device, for example, wirelessly over a communication network or via a hardwired connection. Upon receiving the command(s), printing device 108 transmits configuration data, and identifies itself to computing device 104. Computing device 104 may use the information to recognize the particular make and model of printing device 108 and, thereafter, operates to emulate the printing device, accordingly.

As noted above, a single computing device 104 operates to emulate or otherwise execute applications running on one or more of a plurality of printing devices 108. In one embodiment, a single application operates on computing device 104 and is usable for the computing device to communicate with and execute software associated with a plurality of respective printing devices 108. Alternatively, a plurality of applications are developed, one for each respective printing device 108 make and/or model, and a suitable application is installed on the computing device 104 that corresponds to the particular printing device make/model to which the computing device connects. Once connected to printing device 108, the computing device 104 displays content that appears substantially the same or identical to that displayed on the printing device, while providing the user with computer-related functionality that the printing device would not otherwise support.

In a preferred embodiment, software for various printing devices (e.g., GL4xx and TH2 printer) is stored on a server and made available for download to respective mobile computing devices, such as tablet computers operating the ANDROID operating system, WINDOWS CE devices, BLACKBERRY devices, IPHONES, IPOD TOUCHES, IPADS or other mobile portable devices 104. The software is downloadable from the server, and installed on the mobile computing device. When the mobile computing device communicates or "attaches" to the printing device, the computing device displays the identity of the printing device, and content that is displayed on the printing device is transferred to and displayed by the mobile computing device 104.

Figure 4:
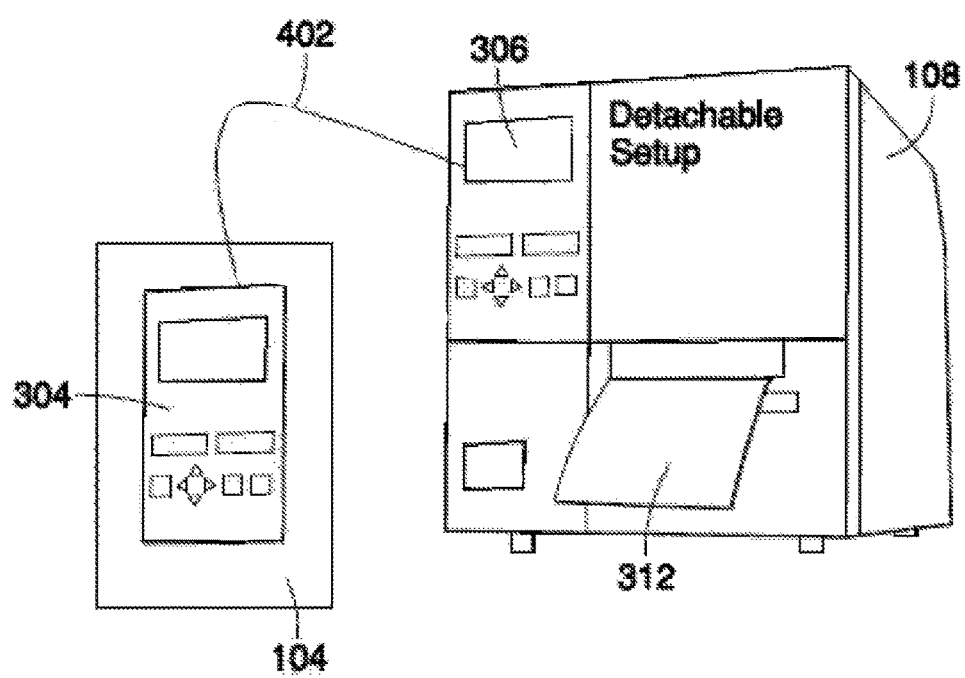
FIG. 4 illustrates an example mobile computing device that is detachably coupled to a printing device in accordance with an embodiment.

In an alternative embodiment, computing device 104 is physically coupled to or otherwise configured to communicate with a printing device 108. For example and in connection with a TH2 printer, a need for a keyboard and display to be provided with the printing device may be eliminated. Moreover, the respective computing device 104 that is communicatively coupled to the printing device 108 provides processing (i.e., "intelligence"), while the printing related functionality (e.g., motor control, sensors, etc.) are provided by internal printer circuitry. For example, computing device 104 communicates with printing device 108, and internal electronics circuitry of the printing device, for example, via USB connection in a high speed serial communication. This configuration provides printer manufacturing cost savings by eliminating a need to retool the printing device with computing device-related functionality, while still providing additional functionality, such as described herein. An example of this configuration is shown in FIG. 4. As shown therein, mobile computing device 104 is coupled to printing device 108 in a detachable setup, for example, via USB connectivity 402. Using the connectivity between devices 104 and 108, via USB connection, application 306 is provided both on mobile computing device 104 and printing device 108.

Figure 5:
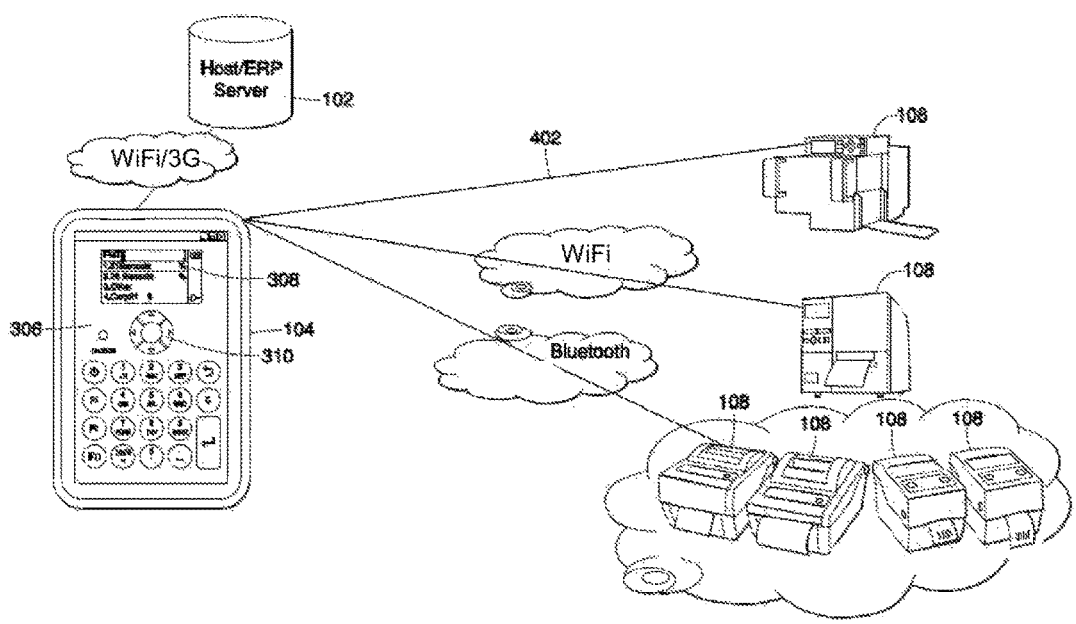
FIG. 5 illustrates an example arrangement of a plurality of printing devices that are communicatively coupled to a mobile computing device, in accordance with an embodiment.

In addition to a physical connectivity, such as shown in FIG. 4, remote connectivity may also be provided via Wi-Fi, BLUETOOTH and/or 3G as function of the computing device. FIG. 5 illustrates an example arrangement of a plurality of printing devices 108 that are communicably coupled to mobile computing device 104 via various protocols. For example, USB connectivity 402 is provided in addition to wireless communications. Wireless communications include Wi-Fi, BLUETOOTH and 3G and are also supported. Further, device 104 is in communication with information processor 102 (illustrated as host/ERP server 102 in FIG. 5) and operable to send and/or receive information associated with printing devices 108. Wi-Fi, BLUETOOTH, USB or other connectivity may significantly reduce development costs and time. Various kinds of information, such as usage and operational information, may be provided for statistical purposes and stored on remote computing device 104. The information may also be forwarded to one or more information processors accessible over the Internet by mobile computing device 108. In addition, information to be output to one or more printing devices 108, such as label and tag printers, may be stored remotely, such as on information processor 102 that is accessible over the network 106. Remote computing device 104 can access the information, and issue instructions to printing device(s) 108 over network 106 to print the information. Similarly, remote computing device 104 may receive software updates for printing device 108 over network 106 and then update printing device 108, accordingly.

As noted above, one or more software applications may be developed, for example, in AEP WORKS, and remote computing device 104 may be allowed or restricted to emulate a printing device 108 as a function of the AEP application. For example, access to one or more data sources (e.g., for viewing, editing or printing) may be restricted to some users while being made available for others. In addition, access to one or more web sites, e-mail voice communication (e.g., 3G, 4G or VOIP), built-in camera, microphone or the like, may be restricted or allowed as a function of one or more applications that execute on remote mobile computing device 104.

In one or more embodiments, the present application provides printing device 108 with communicative coupling to computing device 104, such that computing device 104 executes instructions for functionality that is substantially the same or identical to functionality that is or may be provided by printing device 108. As noted herein, computing device 104 may be a mobile device that is configured to run the ANDROID operating system, such as a tablet computing device. Alternatively, computing device 104 may be a different device, such as a network PC, a laptop computer, a desktop computer, or larger scale computing device.

In an embodiment, PSIM runs on computing device 104 that is configured with the ANDROID operating system, and device 104 sends commands to a printing device 108, such as a SBPL printer. In an alternative embodiment, PSIM is provided with mobile computing device 104 that is configured to run the WINDOWS CE or WINDOWS MOBILE operating system. Computing device 104 runs one or more applications developed, for example, with AEP WORKS or other development application, and uses the one or more applications to print or otherwise control to the printing device. This configuration provides for more functionality than would otherwise be provided using, for example, a SBPL printer since functionality provided using the computing device, including keyboard, touch screen, USB, BLUETOOTH, WLAN, GSM, 3G or the like is fully supported. As will be appreciated by one skilled in the art, the ANDROID operating system is supported by a variety of devices, including smart phones and small tablet computers, as well personal computers (e.g., via a virtual machine), all of which provide computing functionality and flexibility.

Figure 6:
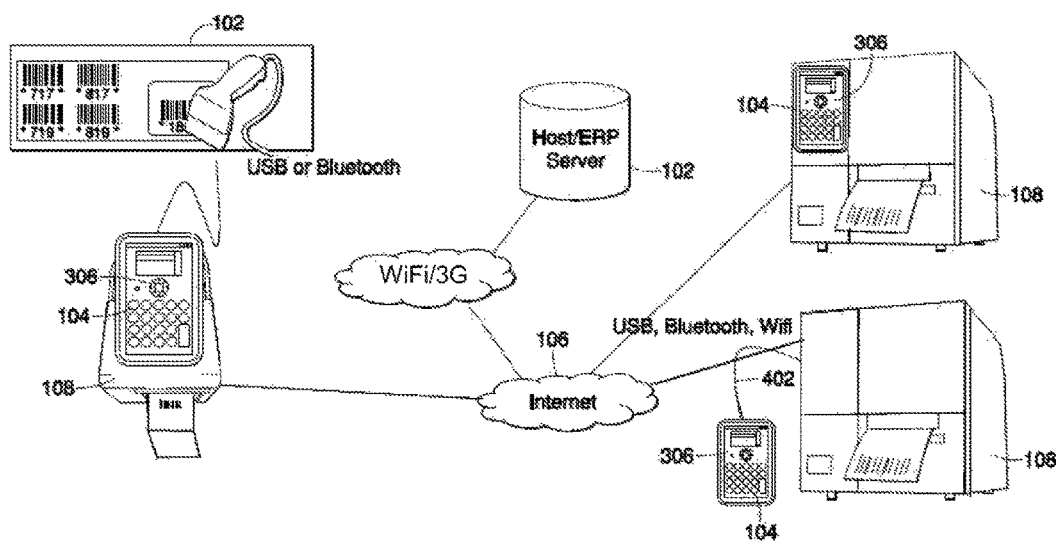
FIG. 6 illustrates a plurality of environments in which communication is provided between various devices, including a mobile computing device and printing devices.

FIG. 6 illustrates a plurality of environments in which communication is provided between various devices, including mobile computing device 104 and printing devices 108. As shown in FIG. 6, communication is provided via Wi-Fi, 3G, BLUETOOTH, and USB connectivity, for example, over the Internet. Further, barcode reading functionality 602 is provided via a scanning device or other optical reader that is either physically coupled to or in communication with computing device 104. In FIG. 6, each of a plurality of mobile devices 106 is coupled to a respective printing device 108 and provide a user interface therebetween for printing-related and data management functionality.

By providing PSIM applications, most AEP features on existing printing devices 108 are available to be executed on one or more mobile computing devices 104. Custom software applications that are developed for a printing device's 108 specific keyboard, for example, developed with AEP WORKS or other software development application, are executable on mobile device 104 and output from the mobile device's 104 keyboard 212 and appropriately formatted, such as SBPL or a bitmap, and sent to printing device 108.

Figure 7:
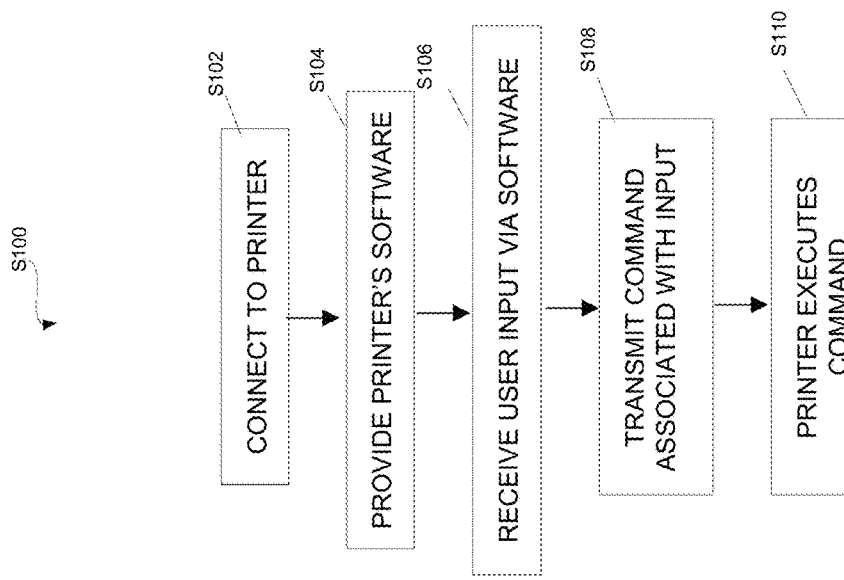
FIGS. 7-9 are flowcharts that illustrate example steps associated with one or more embodiments of the present application.
Figure 8:
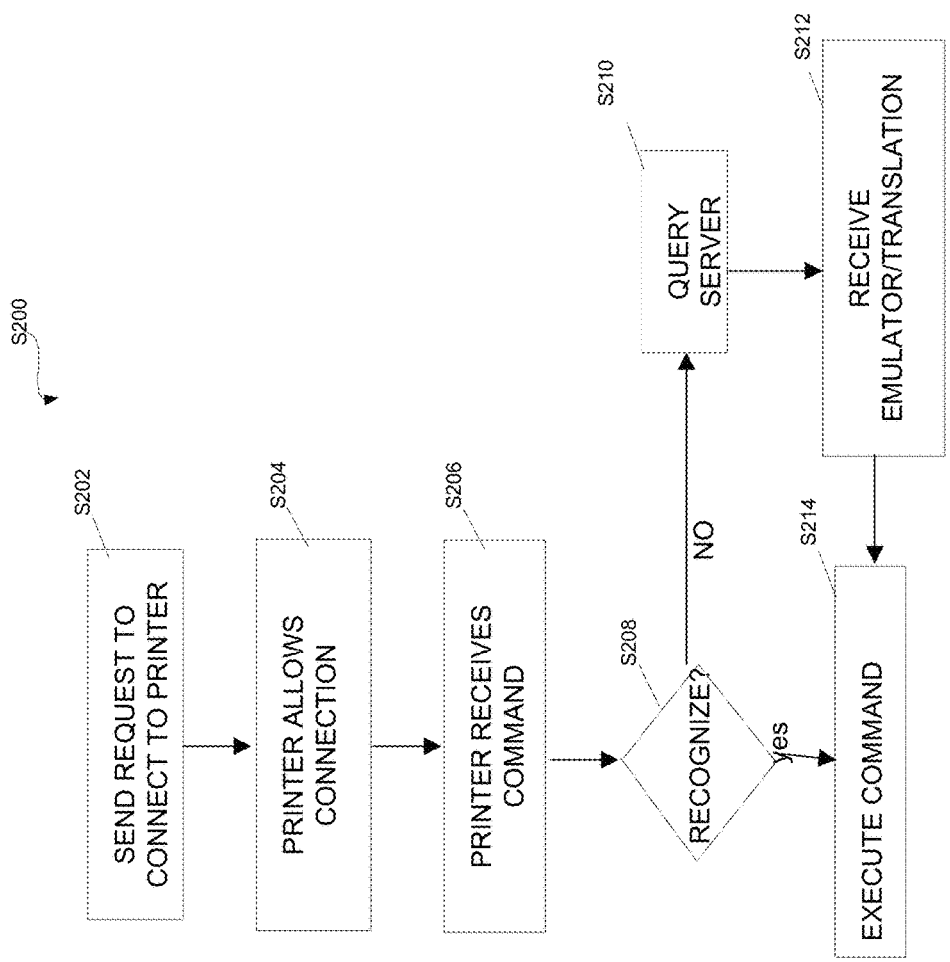
Figure 9:
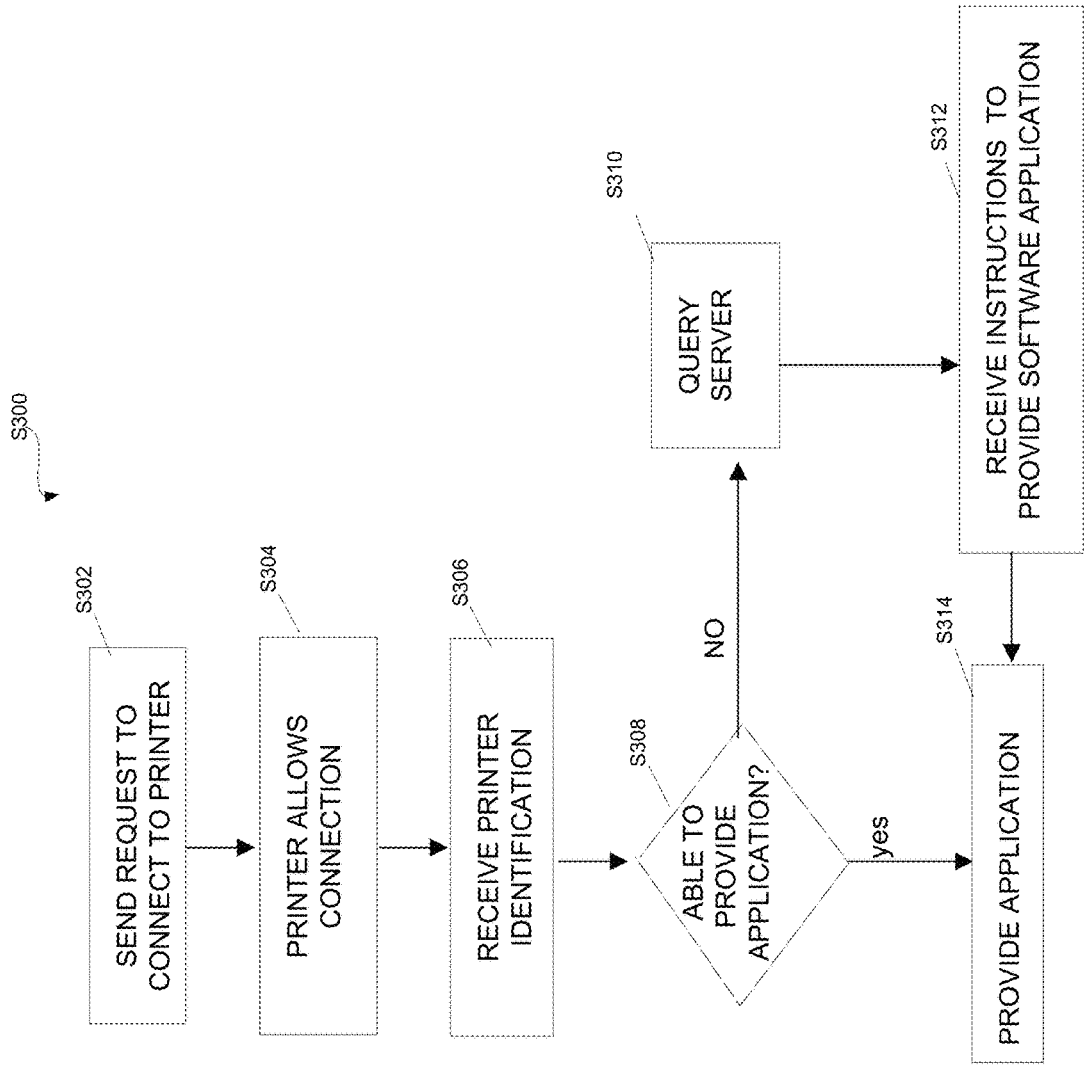

FIGS. 7-9 are flowcharts that illustrate steps associated with one or more embodiments in accordance with the present application. FIG. 7 illustrates steps S100 associated with connecting to printing device 108 by computing device 104 and transmitting a command thereto. At step S102, computing device 104 establishes a communication connection with printing device 108. Thereafter, computing device 104 provides printing device's 108 software application, and, for example, displays graphical screen controls that are provided therein (step S104). In response thereto, computing device 104 receives user input (step S106). Computing device 104 transmits to printing device 108 one or more commands associated with the user input (step S108). Thereafter, printing device 108 executes the command and operates, accordingly (step S110).

FIG. 8 illustrates steps S200 associated with a printing device 108 receiving, from information processor 102 or other server, instructions for interpreting commands that printing device 108 would not otherwise be able to understand. At step S202, computing device 104 transmits a request to connect to printing device 108. Printing device 108, in response, allows the connection (step S204), and printing device 108 receives a command from computing device 104 (step S206). At step S208, a determination is made whether printing device 108 recognizes the command issued by computing device 104. If not, then the process branches to step S210, and information processor 102 ("server") is queried by printing device 108 for assistance. In response, information processor 102 transmits and printing device 108 receives a proper printer emulator and/or a translation of the command received from computing device 104 (step S212). Thereafter, printing device 108 executes the command issued from computing device 104 from step S206 (step S214).

FIG. 9 illustrates steps S300 associated with providing a respective software application for a particular printing device 108. At step S302, computing device 104 transmits a request to connect to printing device 108. Printing device 108, in response, allows the connection (step S304). Printing device 108 transmits, and computing device 104 receives, an identification that represents printing device 108 (step S306). At step S308, a determination is made whether computing device 104 is able to provide the respective software application that corresponds with the software application associated with printing device 108. If not, then the process branches to step S310 and computing device queries information processor 102 ("server") for assistance. Thereafter, information processor 102 transmits, and computing device 104 receives, instructions (e.g., programming code) that enables computing device 104 to provide the software application (step S312). Thereafter, computing device 104 provides the software application (step S314).

Moreover and in accordance with the present application, web access, such as for accessing www.youtube.com, is provided and users can view instruction video relating, for example, to a respective printing device 108. The printing device 108 may be connected and show instruction movies, such as to teach a user how to load labels, how to clean the printer, or the like. In accordance with an embodiment, the printing device is connected to mobile computing device 104, such as a smart phone, and via BLUETOOTH, Wi-Fi or WLAN or other suitable connectivity. As noted herein, printing functionality is accessible via computing device 104 (e.g., a mobile phone), and may be possible for a user as a function of the instructional video that is available, for example, over the Internet 106.

In an alternative embodiment and as illustrated in FIG. 6, a computing device 104, such as operating the ANDROID operating system, is physically integrated with an existing printing device. In this embodiment, the printing device's LCD (or other format) display screen and keyboard are replaced with the computing device operating the ANDROID or other mobile platform operating system. In one embodiment, the computing device is fixedly mounted with or in the printing device. Alternatively, the computing device is detachable and communicates with the printing device via USB cable, BLUETOOTH, Wi-Fi or other suitable way. This provides a low cost solution for the printing device manufacturer since most of the computing power is provided by computing device 104 running the ANDROID or other operating system.

In an embodiment, the programming language LUA is provided or used for developing an AEP application for extensible device functionality that is installed on mobile computing device 104. Alternatively or in addition, PSIM is provided as the AEP application, which visually enables pre-print emulation and the printing device's motion simulation, once the application is installed on the computing device.

In an embodiment, a PSIM graphical user interface ("GUI") operates in a web browser software application and connects to printing device 108 on the network 106 and runs the printing device remotely. This enables remote printer management, as well as assistance and/or support for printing device 108 and its operations, without requiring the use of the printing device's keyboard and/or display.

Another feature provided in accordance with the teachings herein includes an identification and installment of one or more emulators via a server or other remote device. For example, printing device 108 receives an unrecognized command sequence. In operation printing device 108 transmits a description of the sequence or command to a server. The server which may be information processor 102 or other server, replies with a matching, potentially a competitor's, emulator which is then installed in the printing device. Alternatively, the printing device receives a translation of the command sequence from the server, such as in the form of commands that the printing device is capable of interpreting. In that alternative, the server operates as an emulator, and does the emulation for the printing device.

Computing device 104, which may be a tablet computer, is preferably identifiable by software via communication with the printing device. Computing device 104 obtains information (e.g., printer's firmware, relevant database, world time, translation, operation using video content) via one or more Internet web sites accessible to the computing device.

Further, maintenance for printing device 108 can be performed via the remotely connected mobile computing device 104. For example, printing device's 108 firmware can be upgraded via the remotely connected mobile computing device 104. Also, access to time information from information processor 102, other server or web site and used for scheduling a print job or for setting the real time clock in printing device 108 is supported. In this way, an accurate time stamp on a label or other output is ensured once the printing device holds the correct time.

Other operability supported by the teachings herein includes language translation, such as provided on the Internet (e.g., GOOGLE translate) or that may be provided locally from the computing device that is in remote communication with the printing device. In an embodiment, translation menus or information to be printed, such as on printed labels, is performed prior to a printing operation. Computing device 104 may send text strings or text provided in printing device menu options to a software language translator, and translated text is returned and transmitted to printing device 108. For example, a complete menu file or even a product database can be translated in one or more transmissions.

By integrating a computing device with mobile computing device 104, a hypertext transport protocol ("HTTP") client, such as a web browser software application, is provided with a barcode printer. This feature enables many of the features relating to Internet web access described herein. For example, search engine functionality is supported for data stored in memory in or associated with a printing device, or stored in an external database. Preferably, an interface is provided for enabling access to the data and for executing searches thereon.

Other benefits of the teachings herein include support for moving animations, such as in icons, in a printing device that highlight printer-related information, such as status information, and to improve providing instructions to the operator. This provides enhancements to the software application. Further, images and other content to be printed may be previewed, for example, on a display screen or may be saved, such as on an SD card. This functionality enables a user to preview a representation of what will be printed before the printing process occurs. In one embodiment, a "screen dump" can be made to a SD card (or other suitable storage) for future use.

Moreover and in accordance with the teachings herein, printing device 108 configured with computing device 104, such as operating the ANDROID operating system, supports the use of chat or other transmission of messages between a plurality of printing devices 108, between printing device 108 and a computing device 104, or between a plurality of computing devices 104. Operators can send and receive messages using printers' keyboards 210 and displays 214 when connected via LAN or WLAN. Such messages can be used, for example, to notify the receiver of something. A label or receipt can be printed out as well. In this way, printing device 108 can be used to send orders to another printing device 108 or to computing device 104 and receive confirmation of some event. For example and in connection with a restaurant, a waiter selects orders using a printer keyboard 210 and display 214, and sends the order to a printing device 108 in the kitchen. When the kitchen has completed the order, a confirmation is keyed in on the printer or touch screen and sent to the waiter. A receipt of the order is, thereafter, printed on the waiter's printer to notify that the order is ready for delivery. This arrangement eliminates a need for a host server computer to manage the data and/or communications. Instead, point to point communications are established between the printing devices.

Moreover, one or more distributed databases may be provided that reside on or are accessible to a plurality of printing devices 108. A group of printing devices 108 may be accessible to each other and data that are respectively stored thereon can be distributed there-between. If data are missing on one printing device, for example, that printing device may function as a requesting device, and query other printing devices 108 that are communicating over on network 106 for the data. In similar fashion, a distributed load balance for printing of data is supported by the teachings herein. For example, if one printing device 108 is busy, then output may be directed to another printing device 108 that is available on the network. Further, data backup processes or redundancy operations may be supported. Thus a sort of peer-to-peer networking is provided in accordance with the present application.

In addition to managing data for output, a network for upgrading firmware is supported. A check can be performed for printing devices 108 that are available over network 106 whether current versions of firmware or applications are present and, if not, firmware and/or applications may be downloaded and installed. In an embodiment, one printing device 108 that is configured in accordance with the teachings herein may receive software, for example, from a computing device 104, and that printing device 108 can distribute the software to one or more other printing device 108 on network 106.

Printing devices 108 that are configured in accordance with the teachings herein may be thus construed as "social printers." Voice over IP messages may be transmitted to/from printing devices 108, and such printing devices 108 may be used as "walkie-talkies" for notifying operators. Messages or statistics may further be transmitted to a blog site or message board, such as via TWITTER or FACEBOOK. In connection with a business environment, management personnel can access a message board and analyze posts thereon, such as to determine which operator has printed a certain label, when a label was printed, how many labels a certain printing device 108 has printed, or the like. Thus, the teachings herein provide for effective traceability of performance associated with printing.

As noted above, network communications support may be provided with or built-in a printing device 108. For example, 3G, Wi-Fi, or other functionality may be provided to support communication over mobile networks. Network connectivity supports various operations, such as use of a printing device as a logging device. By providing logging information, troubleshooting, performance measurements and other information can be provided. For example, GPS-related information can be captured and used for logging purposes. Other information, such as weather information (e.g., temperature, humidity or the like), amount of usage, and other information can be provided and stored by the printing device, which is also useful for, for example, troubleshooting, quality control and performance measurement.

Thus, as shown and described herein, computing intelligence is provided in or with a printing device 108. Effectively, the printing device is configured as a computer that prints. This configuration provides sales benefits, as the teachings herein eliminate a need for a computer (e.g., a personal computer), which saves costs. Further, the printing device configured as shown and described herein is operable to control other devices, and provides for easier operation, both in off-line and on-line formats. By extending functionality to devices over a communication network, virtually anything that can be accomplished from a mobile computing device, such as a device operating the ANDROID operating system, can be executed from the printing device.

Although the present application is described and shown in relation to particular embodiments thereof, many other variations and modifications and other uses will become apparent to those skilled in the art. Thus, various embodiments and variations are shown and described herein, and it is preferred, therefore, that the present application be limited not by the specific disclosure herein.

What is claimed is:

1. A method of operating a system including a computing device and a printing device, the method comprising:
  providing the computing device with an emulator and a first printing-related software application;
  providing the printing device with a second printing-related software application, the second printing-related software application being substantially the same as the first printing-related software application;
  executing, by the computing device, the first printing-related software application to display a first printing-related operation comprising a print view or a print preview, the first printing-related operation performed by the emulator in response to a first input to the emulator;
  executing, by the printing device, the second printing-related software application to perform a second printing-related operation comprising printing an image in response to a second input to the printing device; and
  wherein, when the first input and the second input are substantially the same, the first printing-related operation and the second printing-related operation are substantially the same such that the print view or print preview and the image are substantially the same.

2. The method of claim 1, wherein at least one of scripts and code libraries are provided to the printing device to extend functionality of the second printing-related software application.

3. The method of claim 1, wherein each of the computing device and the printing device is configured to communicate via a wired or wireless connection over a communication network.

4. The method of claim 3, wherein the second printing-related software application is provided from the computing device to the printing device.

5. The method of claim 3, wherein the printing device is configured with an interpreter of a scripting language, further comprising:
  transmitting, by the computing device to the printing device, an instruction written in the scripting language;
  receiving, by the printing device, the instruction; and
  executing, by the printing device, the instruction with the interpreter.

6. The method of claim 1, further comprising:
providing a connection between a computing device and an other printing device in which the second printing-related software application is not installed;
executing, by the computing device, the first printing-related software application to display printing-related view or preview, when a third input is input to the emulator;
generating, by the computing device, at least one command associated with the third input; and
transmitting, from the computing device to the other printing device, the at least one command,
wherein the other printing device is configured to print the printing-related view in response to the at least one command.

7. The method of claim 1, wherein the first printing-related software application includes firmware that is installed on the printing device.

8. The method of claim 3, further comprising:
transmitting, by the computing device, a request to connect to the printing device; and
providing a connection between the computing device and the printing device as a function of the request.

9. The method of claim 3, further comprising:
receiving, by the computing device and from a second computing device, other software application to be installed on the printing device; and
transmitting, by the computing device, the other software application to the printing device.

10. The method of claim 3, further comprising receiving, by the computing device from the printing device, an identification of the printing device.

11. The method of claim 10, further comprising using, by the emulator provided to the computing device, the identification of the printing device to emulate the printing device accordingly.

12. The method of claim 10, further comprising:
connecting by the computing device to a second computing device;
transmitting, by the computing device to the second computing device, the identification; and
receiving, by the computing device and from the second computing device, an instruction that, when executed by the computing device, provides the first printing-related software application on the computing device, as a function of the identification transmitted to the second computing device.

13. The method of claim 1, wherein the computing device is programmed and configured with one or more of the ANDROID operating system, IOS, WINDOWS CE, SYMBIAN, and PSIM.

14. The method of claim 3, further comprising:
receiving, by the computing device and from a second computing device, information to be printed on the printing device; and
transmitting, by the computing device, the information to the printing device.

15. The method of claim 1, wherein the second printing-related software application with which the printing device is provided includes a LUA language interpreter, and the first printing-related software application on the computing device is written in LUA programming language.

16. A method of operating a system including a computing device and a printing device, the method comprising:
providing the computing device with an emulator and a first printing-related software application, the first printing-related software application being not installed in the printing device;
providing a connection between the computing device and the printing device such that the computing device is configured to communicate remotely with the printing device;
executing, by the computing device, the first printing-related software application to display a printing-related view or preview, the printing-related view or preview generated in response to a first input to the emulator;
generating, by the computing device, at least one command associated with the first input; and
transmitting, from the computing device to the printing device, the at least one command,
wherein the printing device is configured to print an image that is substantially the same as the printing-related view or preview in response to the at least one command.

17. A system comprising:
a computing device having an emulator and a first printing-related software application installed therein, the computing device configured to execute the first printing-related software application to display a first printing-related operation comprising a print view or a print preview, the first printing-related operation performed by the emulator in response to a first input to the emulator; and
a printing device having a second printing-related software application installed therein, the second printing-related software application being substantially the same as the first printing-related software application, the printing device configured to execute the second printing-related software application to perform a second printing-related operation comprising printing an image in response to a second input to the printing device;
wherein the computing device is configured to communicate remotely with the printing device; and
wherein, when the first input and the second input are substantially the same, the first printing-related operation and the second printing-related operation are substantially the same such that the print view or print preview and the image are substantially the same.

18. The system of claim 17, wherein at least one of scripts and code libraries are provided to the printing device to extend functionality of the second printing-related software application.

19. The system of claim 17, wherein each of the computing device and the printing device is configured to communicate via a wired or wireless connection over a communication network.

20. The system of claim 19, wherein the second printing-related software application is provided from the computing device to the printing device.

21. The system of claim 19, wherein the computing device is configured to transmit an instruction written in a scripting language to the printing device, and the printing device is configured to include an interpreter of the scripting language and to execute the instruction with the interpreter.

22. The system of claim 17, wherein the computing device is configured to:
connect to an other printing device in which the second printing-related software application is not installed;

executing the first printing-related software application to display printing-related view or preview, when a third input is input to the emulator;

generate at least one command associated with the third input; and transmit the at least one command to the other printing device, and wherein the other printing device is configured to print the printing-related view in response to the at least one command.

23. The system of claim 17, wherein the first printing-related software application includes firmware that is installed on the printing device.

24. The system of claim 19, wherein the computing device is further programmed and configured to transmit a request to connect to the printing device, and to connect to the printing device as a function of the request.

25. The system of claim 19, wherein the computing device is further programmed and configured to receive, from a second computing device, software to be installed on the printing device, and to transmit the software to the printing device.

26. The system of claim 19, wherein the computing device is further programmed and configured to receive, from the printing device, an identification of the printing device.

27. The system of claim 26, wherein the emulator installed in the computing device is programmed and configured to use the identification of the printing device to emulate the printing device accordingly.

28. The system of claim 26, wherein the computing device is further programmed and configured to:
connect to a second computing device;
transmit the identification to the second computing device; and
receive, from the second computing device, an instruction that, when executed by the computing device, provides the first printing-related software application on the computing device, as a function of the identification transmitted to the second computing device.

29. The system of claim 17, wherein the computing device is programmed and configured with one or more of the ANDROID operating system, IOS, WINDOWS CE, SYMBIAN, and PSIM.

30. The system of claim 17, wherein the printing device does not display the second printing-related software application.

31. The method of claim 16, wherein the computing device is programmed and configured with one or more of the ANDROID operating system, IOS, WINDOWS CE, SYMBIAN, and PSIM.

32. A system comprising:
a computing device having an emulator and a first printing-related software application installed therein, and
a printing device in which the first printing-related software application is not installed, the printing device being connected to the computing device such that the computing device is configured to communicate remotely with the printing device,
wherein the computing device is configured to:
execute the first printing-related software application to display a printing-related view or preview, the printing-related view or preview generated in response to a first input to the emulator;
generate at least one command associated with the first input;
transmit the at least one command to the printing device, and
wherein the printing device is configured to print an image that is substantially the same as the printing-related view or preview in response to the at least one command.

* * * * *